US007934710B2

(12) United States Patent
Chiu

(10) Patent No.: US 7,934,710 B2
(45) Date of Patent: May 3, 2011

(54) CLAMP AND METHOD FOR OPERATING SAME

(75) Inventor: Donald Wai-Chung Chiu, Santa Clara, CA (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/734,187

(22) Filed: Apr. 11, 2007

(65) Prior Publication Data

US 2007/0187880 A1 Aug. 16, 2007

Related U.S. Application Data

(63) Continuation-in-part of application No. 11/041,670, filed on Jan. 24, 2005, now Pat. No. 7,213,803.

(51) Int. Cl.
*B23Q 3/08* (2006.01)

(52) U.S. Cl. ................................ 269/24; 269/32; 269/27

(58) Field of Classification Search .................... 269/24, 269/27, 32, 228, 20
See application file for complete search history.

(56) References Cited

U.S. PATENT DOCUMENTS

| | | | | |
|---|---|---|---|---|
| 4,265,434 | A * | 5/1981 | Hamilton et al. | 269/27 |
| 4,351,516 | A * | 9/1982 | Ersoy et al. | 269/27 |
| 5,013,015 | A * | 5/1991 | Fatheree | 269/24 |
| 5,884,903 | A | 3/1999 | Sawdon | |
| 5,927,700 | A * | 7/1999 | Yonezawa | 269/24 |
| 6,059,277 | A | 5/2000 | Sawdon et al. | |
| 6,736,384 | B2 * | 5/2004 | Yokota | 269/32 |
| 6,902,158 | B2 | 6/2005 | Yonezawa et al. | |
| 2006/0163789 | A1 | 7/2006 | Chiu | |

* cited by examiner

*Primary Examiner* — Lee D Wilson
(74) *Attorney, Agent, or Firm* — Holland & Hart, LLP

(57) ABSTRACT

In an embodiment, there is disclosed a clamp having a frame and a latch member mounted within the housing so that the latch member is translatable along a displacement axis and rotatable about the displacement axis. A cam follower mounted to the frame engages a channel operatively associated with the latch member. An actuator mounted to the frame and operatively associated with the latch member translates the latch member along the displacement axis. The engagement of the cam follower and channel causes the latch member to be rotated about the displacement axis as the latch member is translated along the displacement axis.

22 Claims, 12 Drawing Sheets

CLAMP AND METHOD FOR OPERATING SAME

PRIORITY CLAIM

This patent application is a continuation-in-part of prior U.S. patent application Ser. No. 11/041,670, filed Jan. 24, 2005 now U.S. Pat. No. 7,213,803 by Donald Wai-Chung Chiu for CLAMP AND METHOD FOR OPERATING SAME. The above-identified patent application is hereby incorporated herein by reference.

BACKGROUND

In many manufacturing operations, newly manufactured parts need to be tested to ensure that the new parts have been manufactured according to the design specifications and to ensure that the new parts perform as expected under specific test conditions. A wide variety of test equipment and instrumentation is utilized to test such newly manufactured parts.

When testing such parts, it is often necessary to securely hold or clamp the newly manufactured parts to test apparatus for a short period of testing. For example, in the electronics industry, an electronic device will need to be clamped to a tester so that the tester can test the electronic device. The clamping must be accomplished in such a way as to allow various probes on the tester to reliably contact various circuit nodes and contacts provided on the electronic device. Testing operations can be enhanced by clamping systems that can quickly and accurately clamp and release the electronic device to be tested.

SUMMARY OF THE INVENTION

In one embodiment, there is disclosed a clamp, comprising a housing; a latch member mounted within the housing so that the latch member is translatable along a displacement axis and rotatable about the displacement axis, the latch member defining a channel therein; a cam follower mounted to the housing, the cam follower engaging the channel in the latch member; and an actuator mounted to the housing and operatively associated with the latch member, the actuator translating the latch member along the displacement axis, the engagement of the cam follower in the channel causing the latch member to be rotated about the displacement axis as the latch member is translated along the displacement axis.

In another embodiment, there is disclosed a method for operating a clamp, comprising operating an actuator to cause a latch member to translate along a displacement axis toward an extended position, the latch member cooperating with a cam follower associated with the clamp so that the latch member rotates about the displacement axis as the latch member is translated along the displacement axis; engaging a clamp end of the latch member with a component to be clamped; and operating the actuator to cause the latch member to translate along the displacement path toward a retracted position, the cam follower causing the latch member to rotate about the displacement axis as the latch member is translated along the displacement axis to the retracted position, the rotation and translation of the latch member causing the clamp end of the latch member to clamp the component and draw the component toward the retracted position.

In still another embodiment, there is disclosed a clamp, comprising a latch member; a housing, the housing receiving the latch member so that the latch member is translatable along a displacement axis and rotatable about the displacement axis, the housing defining a channel therein; a cam follower mounted to the latch member, the cam follower engaging the channel in the frame; and an actuator mounted to the housing and operatively associated with the latch member, the actuator translating the latch member along the displacement axis, the engagement of the cam follower in the channel causing the latch member to be rotated about the displacement axis as the latch member is translated along the displacement axis.

BRIEF DESCRIPTION OF THE DRAWINGS

Illustrative and presently preferred exemplary embodiments of the invention are shown in the drawings in which.

DETAILED DESCRIPTION

Figure 1:
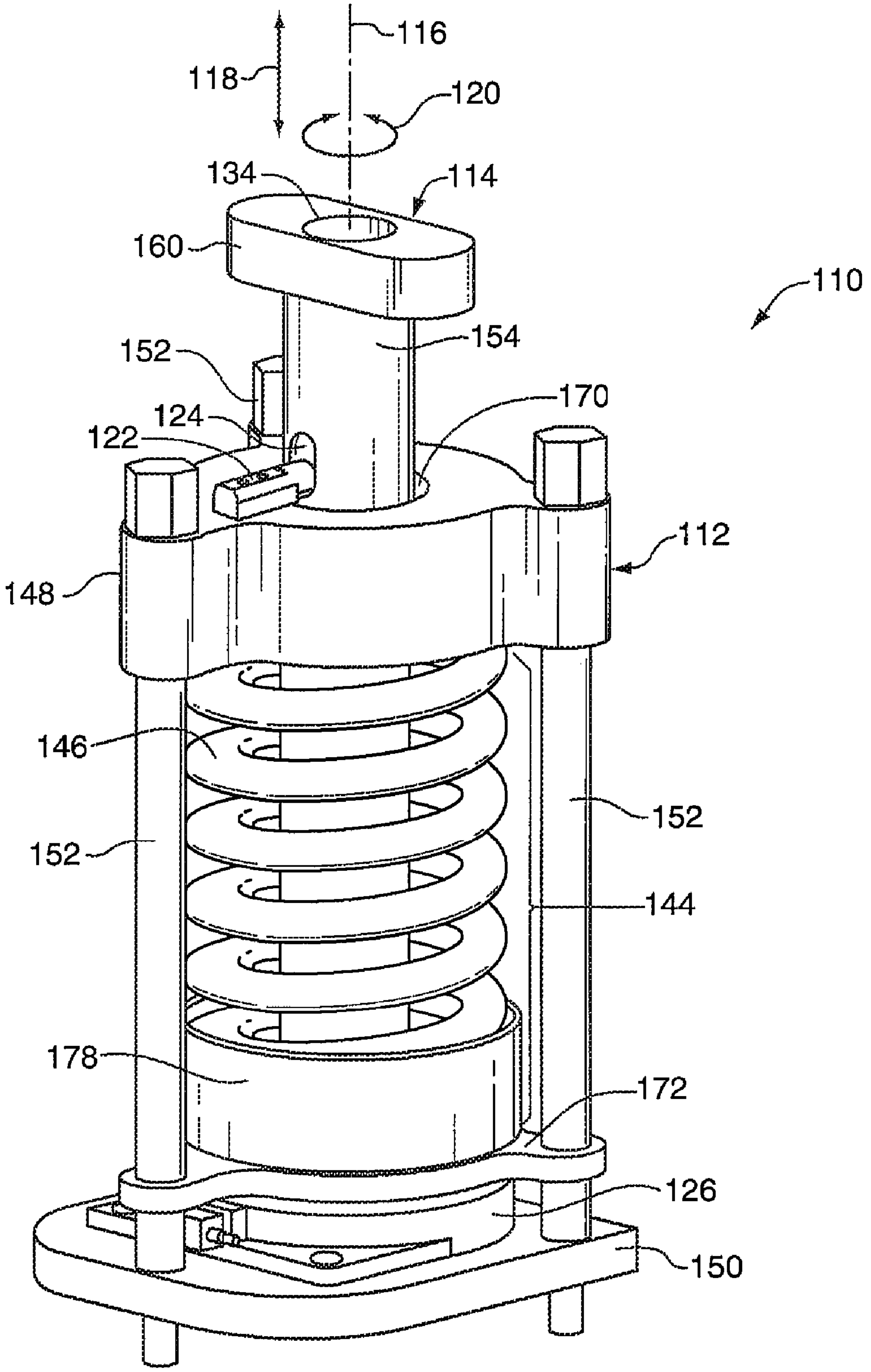
FIG. 1 is a perspective view of one embodiment of a clamp.
Figure 2:
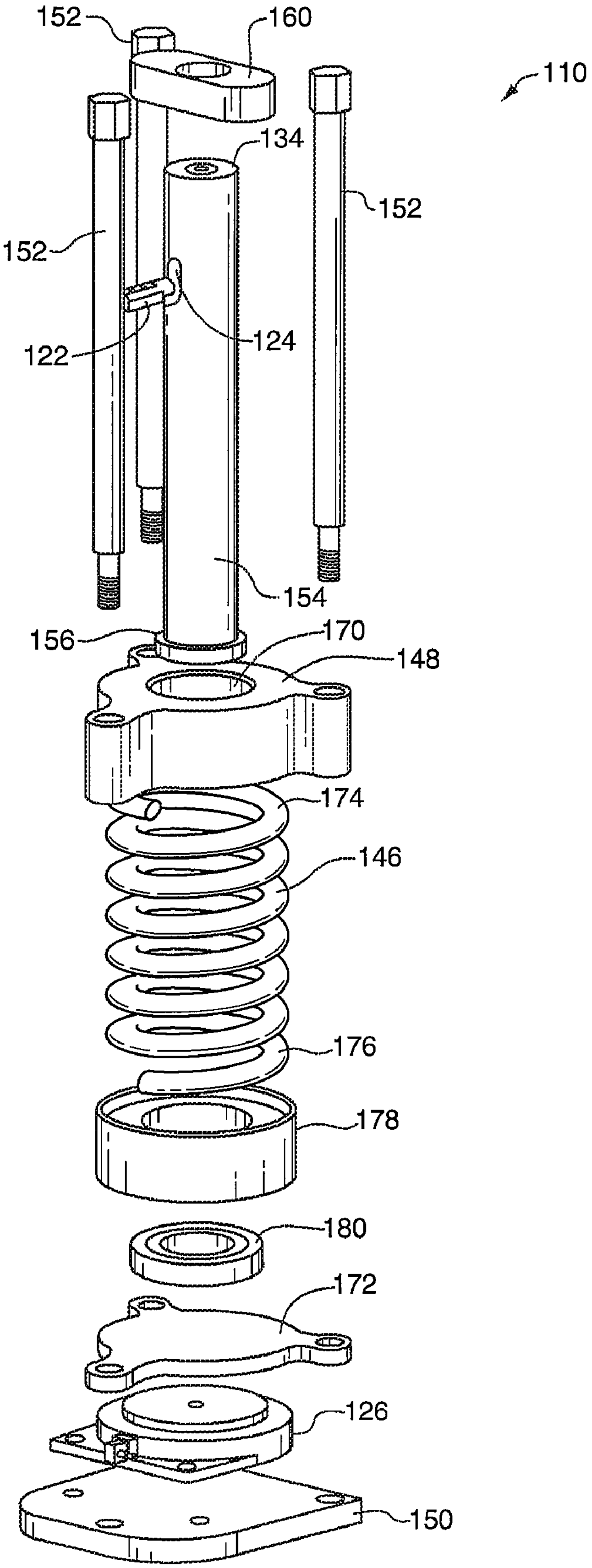
FIG. 2 is an exploded perspective view of the clamp of FIG. 1.

One embodiment of a clamp 110 is illustrated in FIGS. 1 and 2 and comprises a frame 112, and a latch member 114 mounted within the frame 112. The mounting arrangement of the latch member 114 within the frame 112 allows the latch member 114 to be translated along a displacement axis 116, i.e., generally in the directions indicated by arrows 118. The mounting arrangement also allows the latch member 114 to be rotated about the displacement axis 116, i.e., generally in the directions indicated by arrows 120. A guide pin 122 mounted to the frame 112 engages a corresponding channel 124 associated with the latch member 114. An actuator 126 is mounted to the frame 112 and is operatively associated with the latch member 114. The actuator 126 moves or translates the latch member 114 along the displacement axis 116. As the latch member 114 is translated along the displacement axis 116, i.e., in the directions indicated by arrows 118, the engagement of the guide pin 122 and the channel 124 causes the latch member 114 to be rotated about the displacement axis 116, i.e., in the directions indicated by arrows 120. In one embodiment, the clamp 110 is provided with a biasing member 144, such as a spring 146, which biases the latch member 114 toward a retracted position 140.

Figure 4C:
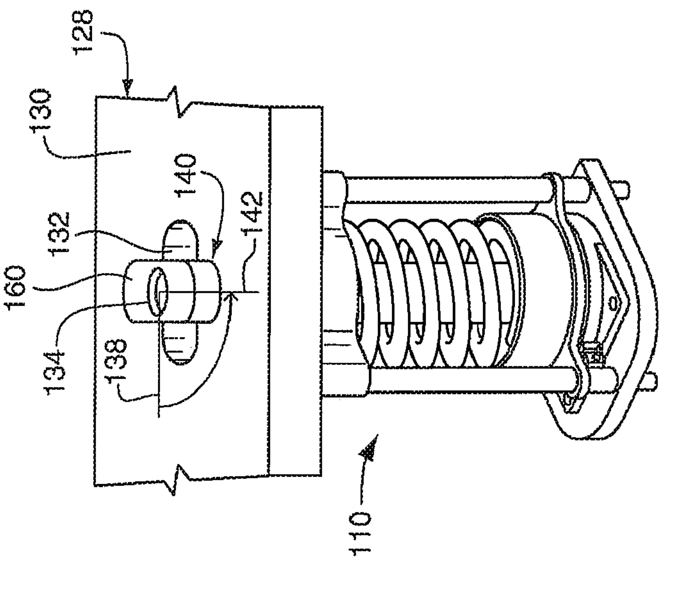
FIGS. 4A, 4B and 4C are perspective sequential views of one operational mode of the clamp.
Figure 4B:
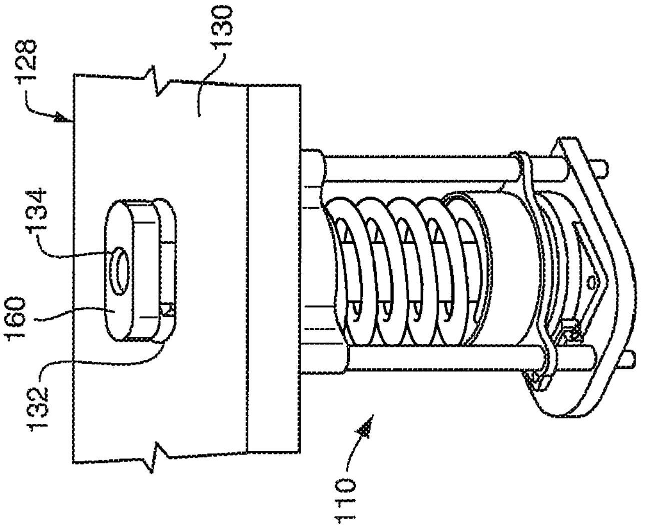
Figure 4A:
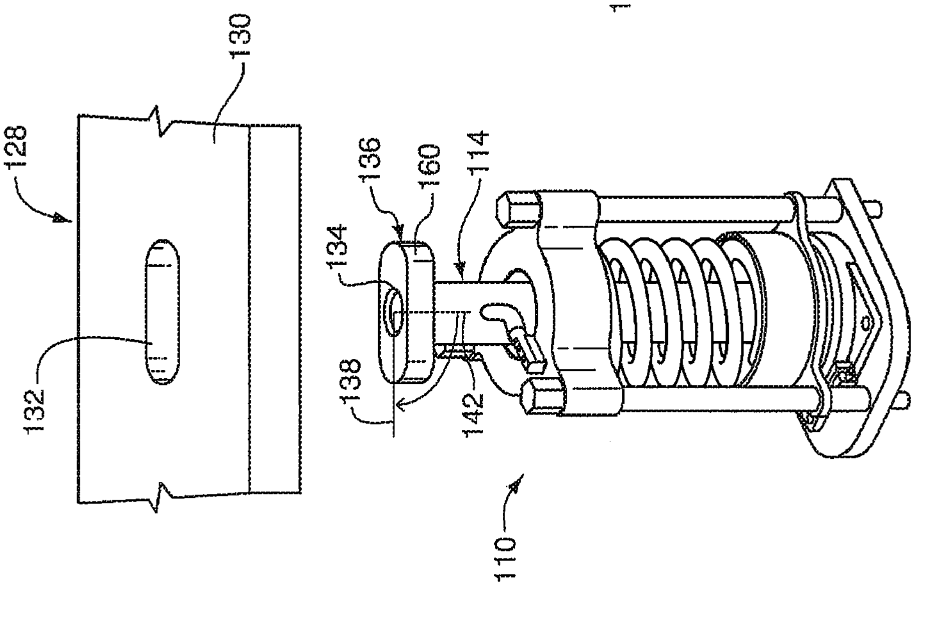

The rotation of the latch member 114 about the displacement axis 116 as the latch member 114 is translated along the displacement axis 116 allows the clamp 110 to engage and securely hold a component 128 to be clamped. With reference now to FIGS. 4A-C, in one exemplary application, the component 128 to be clamped may comprise a portion 130 having an aperture or hole 132 formed therein. The aperture 132 is sized to slidably receive a clamp end 134 of the latch member 114 when the latch member 114 is in an extended position 136. See FIG. 4A. When the latch member 114 is in the extended position 136, the clamp end 134 of the latch member 114 will be located at a displaced rotational position 138. The component 128 to be clamped and the clamp 110 may then be brought together in the manner illustrated in FIG. 4B, e.g., so that the clamp end 134 of latch member 114 is engaged with and extends through the aperture 132 in the component 128 to be clamped.

The actuator 126 may then be operated to cause the latch member 114 to be translated along the displacement axis 116, e.g., from the extended position 136 to the retracted position 140. In the embodiment shown and described herein wherein the clamp 110 is provided with a biasing member 144, the latch member 114 may be moved from the extended position 136 to the retracted position 140 by simply de-energizing the actuator 126 and allowing the biasing member 144 to return the latch member 114 to the retracted position 140. As the latch member 114 returns to the retracted position 140, the engagement of the guide pin 122 with the channel 124 causes the latch member 114 to rotate about the displacement axis 116, e.g., from the displaced rotational position 138 to an initial rotational position 142. The translation and rotation of the latch member 114 causes the clamp end 134 of the latch member 114 to clamp the component 128 and draw the component 128 toward the retracted position 140, as best seen in FIG. 4C. In the embodiment shown and described herein, the biasing member 144 (e.g., spring 146) securely holds the component 128 in engagement with the clamp 110 without the need to further operate the actuator 126.

One aspect of the clamp 110 is that clamping is achieved using only a single actuator 126 to produce two desired movements of the latch member 114 (i.e., translation along and rotation about the displacement axis 116). The use of a single actuator 126 to produce the two desired movements of the latch member 114 also eliminates the need for a timing sequence to coordinate the two desired movements which would be required if separate actuators were used to produce the two desired movements. In addition, the modular design of the clamp 110 allows the clamp 110 to be conveniently mounted almost anywhere. The modular design also allows any desired number of clamps to be readily used in a desired application. In embodiments wherein the clamp 110 is provided with a biasing member 144 (e.g., spring 146), the biasing member 144 may be configured to bias the clamp in the retracted position 140 (FIG. 4C). Accordingly, the clamp 110 will continue to provide the clamping function without the need to continuously operate or energize the actuator.

Having briefly described one embodiment of a clamp, various exemplary embodiments of the clamp will now be described in greater detail. However, before proceeding with the description it should be noted that the various embodiments of the clamp 110 are shown and described herein as they may be used to provide a clamping function in a circuit testing application. In this exemplary application, the clamp 110 is mounted to a circuit test head and the component 128 to be clamped comprises an electronic device to be tested. The clamp 110 is used to clamp the electronic device to the circuit test head, allowing the test head to test the electronic device. Accordingly, the particular sizes and configurations of the various components of the clamp 110, as well as the materials that may be used to fabricate the various components are consistent with this particular application. However, persons having ordinary skill in the art, after having become familiar with the teachings provided herein, will recognize that various modifications may be made to the clamp depending on the particular application.

Referring back now primarily now to FIGS. 1 and 2, one embodiment of a clamp 110 may comprise a frame 112 configured to receive a latch member 114. The frame 112 and latch member 114 are configured so that the latch member 114 is translatable and rotatable about a displacement axis 116, as indicated by arrows 118 and 120, respectively. Accordingly, the frame 112 may comprise any of a wide variety of structures and configurations suitable for this purpose. However, by way of example, in the embodiment shown and described herein, the frame 112 may comprise an upper plate 148 and a lower plate 150 that are positioned in spaced-apart relation by a plurality of elongate rods 152, as best seen in FIG. 1.

The various components, such as upper plate 148, lower plate 150, and elongate rods 152, comprising the frame 112 may be fabricated from any of a wide variety of materials, such as metals, plastics, or combinations thereof, suitable for the intended application. However, by way of example, in one embodiment, the upper and lower plates 148 and 150, as well as the elongate rods 152, are fabricated from aluminum.

In one embodiment, the upper plate 148 is provided with a bearing member 170 (FIG. 3) suitable for allowing both axial and radial (i.e., rotational) movement of the latch member 114 with respect to the upper plate 148. Alternatively, a separate bearing member 170 may not be required, depending on the particular application. For example, the particular materials used for the latch member 114 and upper plate 148 may or may not indicate the need for a separate bearing member 170. Similarly, a separate bearing member 170 may not be required if the expected loads are small or if the expected number of cycles during the life of the clamp is low. If a separate bearing member 170 is used, bearing member 170 may comprise any of a wide range of bearing types suitable for the intended application. By way of example, in the embodiment shown and described herein, bearing member 170 comprises a bronze bushing sized to slidably and rotatably receive the latch member 114 in the manner described herein.

Latch member 114 is best seen in FIG. 2 and may comprise an elongate shaft 154 having a flange end 156 and a clamp end 134. The clamp end 134 may be provided with a boss or clamp member 160 suitable for engaging the aperture 132 provided in the component 128 to be clamped. See FIGS. 4A-C. Accordingly, the clamp member 160 may comprise any of a wide variety or shapes or configurations and should not be regarded as limited to the particular shape shown and described herein. The clamp member 160 may comprise a separate component that is attached to the elongate shaft 154, as best seen in FIG. 2. Alternatively, the clamp member 160 could be formed as a single piece (i.e., integral) with elongate shaft 154.

Figure 3:
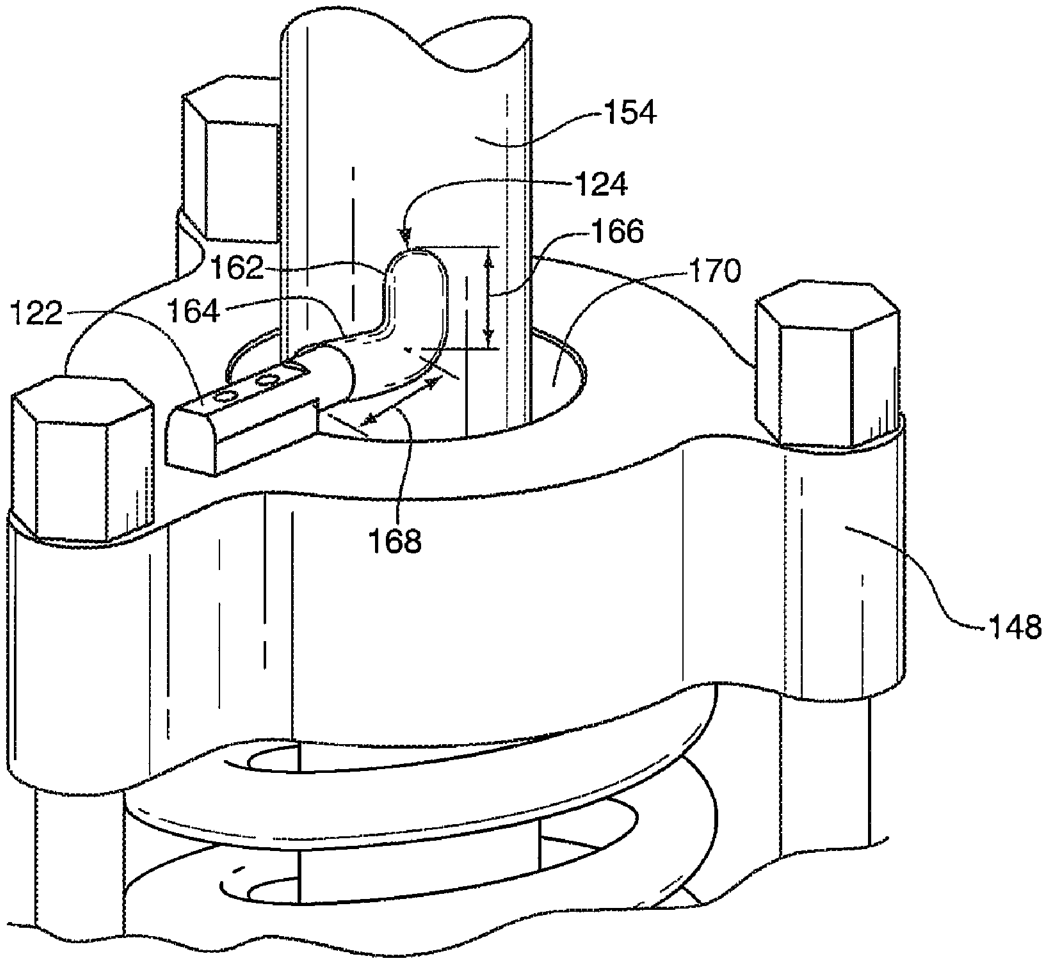
FIG. 3 is an enlarged perspective view of the clamp showing the engagement of the guide pin and channel.

Referring now primarily to FIG. 3, elongate shaft 154 may also be provided with a channel or groove 124 therein sized to engage the guide pin 122. The channel or groove 124 may be provided with a first section 162 that is substantially axially oriented along the length of the elongate shaft 154. The channel or groove 124 may also be provided with a second section 164 that includes a transverse component (i.e., a component that is not substantially axially oriented). The length 166 of the first section 162 dictates the length or distance by which the latch member 114 moves along the displacement axis 116 before the latch member 114 begins to rotate. Thus, the length 166 of the first section 162 of channel 124 may be selected to be any convenient length suitable for the intended application.

The length 168 of the second section 164 dictates the length or distance by which the latch member 114 moves along the displacement axis 116, as well as the degree of rotation about the displacement axis 116. Thus, the motion "schedule" (i.e., the length by which the latch member moves along the displacement axis 116, the degree of rotation about the displacement axis 116, as well as the point at which rotation begins)

can be selected as desired by simply providing the channel 124 with first and second sections 162 and 164 having the appropriate lengths and transverse components. Consequently, the latch member 114 should not be regarded as limited to having a groove or channel 124 having first and second sections 162 and 164 that provide the particular motion schedule shown and described herein. However, by way of example, in one embodiment, the groove or channel 124 is configured to provide a total axial (i.e., translational) movement along the displacement axis 116 of about 5.0 millimeters. The groove or channel 124 is configured to provide total rotational movement about the displacement axis 116 (i.e., the angular difference between the displaced rotational position 138 and the initial rotational position 142) of about 45°. In an alternative embodiment, the channel 124 is configured to provide a total rotational movement of about 90°.

The various components comprising the latch member 114 may be fabricated from any of a wide variety of materials, such as metals, plastics, or combinations thereof, suitable for the intended application. However, by way of example, in one embodiment, the elongate shaft 154 as well as the clamp member 160 are fabricated from a steel.

Guide pin 122 may be mounted to the frame 112 at any convenient position that will allow the guide pin 122 to engage the channel 124 associated with the latch member 114. However, by way of example, in one embodiment, the guide pin 122 is mounted to the upper plate 148 of frame 112 in the manner best seen in FIG. 3.

Guide pin 122 may be fabricated from any of a wide range of materials, such as metals or plastics, suitable for the intended application. However, it is generally preferred that the material used to fabricate the guide pin 122 provide a low-friction engagement with the material selected for the elongate shaft 154 in which the channel 124 is formed. Thus, in the embodiment shown and described herein wherein the elongate shaft 154 comprises steel, the guide pin 122 is fabricated from bronze. Optionally, a suitable lubricant may also be provided to further ensure a low-friction engagement of the guide pin 122 and channel 124.

Before proceeding it should be noted that the positions of the guide pin 122 and the channel 124 could be interchanged. That is, the guide pin 122 could be mounted to the latch member 114 and the channel 124 provided on the frame 112. Still other arrangements are possible, as would become apparent to persons having ordinary skill in the art after having become familiar with the teachings provided herein.

Referring back now to FIGS. 1 and 2, the clamp 110 may also be provided with an actuator 126 suitable for moving the latch member 114 along the displacement axis 116 in the manner described herein. The actuator 126 may comprise any of a wide range of actuators (e.g., pneumatic, hydraulic, or electric) suitable for providing the desired magnitude (i.e., length) of motion of the latch member 114 along the displacement axis 116. However, by way of example, in one embodiment, the actuator 126 comprises a pneumatic actuator.

In the embodiment shown and described herein, a push plate 172 is positioned between the actuator 126 and the latch member 114. The push plate 172 is slidably mounted to the rods 152 of the frame 112 and serves to support the flange end 156 of the latch member 114 as well as to distribute the force applied by the actuator 126. Consequently, the push plate 172 helps to prevent binding of the latch member 114 as the same is moved between the retracted position 140 and the extended position 136 (See FIGS. 4A-C). The push plate 172 may be fabricated from any of a wide variety of materials (e.g., metals or plastics) suitable for the intended application. By way of example, in one embodiment the push pate 172 is fabricated from steel.

In the embodiment shown and described herein, the clamp 110 is also provided with a biasing member 144 which biases the latch member 114 in the retracted position 140. The use of the biasing member 144 thereby allows the clamp 110 to exert a clamping force on the component 128 (FIGS. 4A-C) being clamped without the need to operate (e.g., continuously energize) the actuator 126. The biasing member 144 may comprise a coil spring 146 having a first end 174 positioned in contact with the upper plate 148. A second end 176 of spring 146 is received by a lower support 178. Lower support 178 is configured to contact the push plate 172 in the manner best seen in FIG. 2.

Spring 146 and lower support 178 may be fabricated from any of a wide variety of materials, such as metals or plastics, suitable for the particular application. By way of example, in one embodiment, spring 146 comprises steel, whereas lower support 178 comprises aluminum.

It should be noted that if a biasing member 144 is provided, it may be configured or arranged to bias the latch member 114 in either the retracted position 140 or the extended position 136. If the biasing member 144 is configured to bias the latch member 114 in the extended position 136, then continuous operation of the actuator 126 will be required to maintain clamping of the component 128 to be clamped, which may be required or desired depending on the particular application.

Referring now primarily to FIG. 2, the clamp 110 may be provided with a bearing 180 suitable for receiving the flange end 156 of the elongate shaft 154. The bearing 180 supports the flange end 156 of the elongate shaft 154 and allows the elongate shaft 154 to be rotated with respect to the push plate 172. In the embodiment shown and described herein, the bearing 180 is captured or held between the lower support 178 and push plate 172. In this manner, the bearing 180 retains the flange end 156 of the elongate shaft 154 so as to enable a transfer of the clamping force applied by the biasing member 144 to both the shaft 154 and clamp member 160. Lower support 178 may be provided with a suitable recess (not shown) therein to receive the bearing 180.

Bearing 180 may comprise any of a wide range of bearing types, depending on the particular application. However, by way of example, in one embodiment, bearing 180 may comprise a cross roller bearing.

Clamp 110 may be used in any of a wide variety of applications to clamp or secure a component 128 to be clamped. Consider, for example, the situation illustrated in FIGS. 4A-C wherein the component 128 to be clamped comprises a portion 130 having an aperture or hole 132 formed therein. The aperture 132 is sized to slidably receive the clamp end 134 provided on the latch member 114 when the clamp end 134 is in the displaced rotational position 138. As mentioned, the clamp end 134 of latch member 114 is in the displaced rotational position 138 when the latch member 114 is in the extended position 136. See FIG. 4A. Accordingly, a first step in the clamping process involves operating the actuator 126 to move the latch member 114 to the extended position 136. The component 128 to be clamped and the clamp 110 may then be brought together in the manner shown in FIG. 4B, i.e., so that the clamp end 134 of latch member 114 is engaged with and extends through the aperture 132 in the component 128 to be clamped.

The actuator 126 may then operated to cause the latch member 114 to be translated along the displacement axis 116, e.g., from the extended position 136 to the retracted position 140 illustrated in FIG. 4C. The latch member 114 may be moved from the extended position 136 to the retracted position 140 by operating the actuator 126 to return the latch member 114 to the retracted position 140. In the embodiment shown and described herein wherein the clamp 110 includes a biasing member 144 for biasing the latch member 114 toward the retracted position 140, the latch member 114 may be returned to the retracted position 140 by simply de-energizing the actuator 126. In the case where the actuator 126 comprises a pneumatic actuator, this can be accomplished by simply releasing the air pressure supplied to the actuator 126. As the latch member 114 moves to the retracted position 140, the engagement of the guide pin 122 with the channel 124 causes the latch member 114 to rotate about the displacement axis 116, e.g., from the displaced rotational position 138 to the initial rotational position 142. The translation and rotation of the latch member 114 causes the clamp end 134 of the latch member 114 to clamp the component 128 and draw the component 128 toward the retracted position 140, as best seen in FIG. 4C). The biasing member 144 (e.g., spring 146) securely holds the component 128 in engagement with the clamp 110 without the need to further operate the actuator 126.

The component 128 to be clamped may be released by operating the actuator 126 to move the latch member 114 to the extended position 136. As the latch member 114 moves to the extended position, the engagement of the guide pin 122 and the channel 124 causes the latch member 114 to be rotated from the initial rotational position 142 (FIG. 4C) to the displaced rotational position 138 (FIG. 4A), thereby allowing the component 128 to be disengaged from clamp 110.

Figure 5:
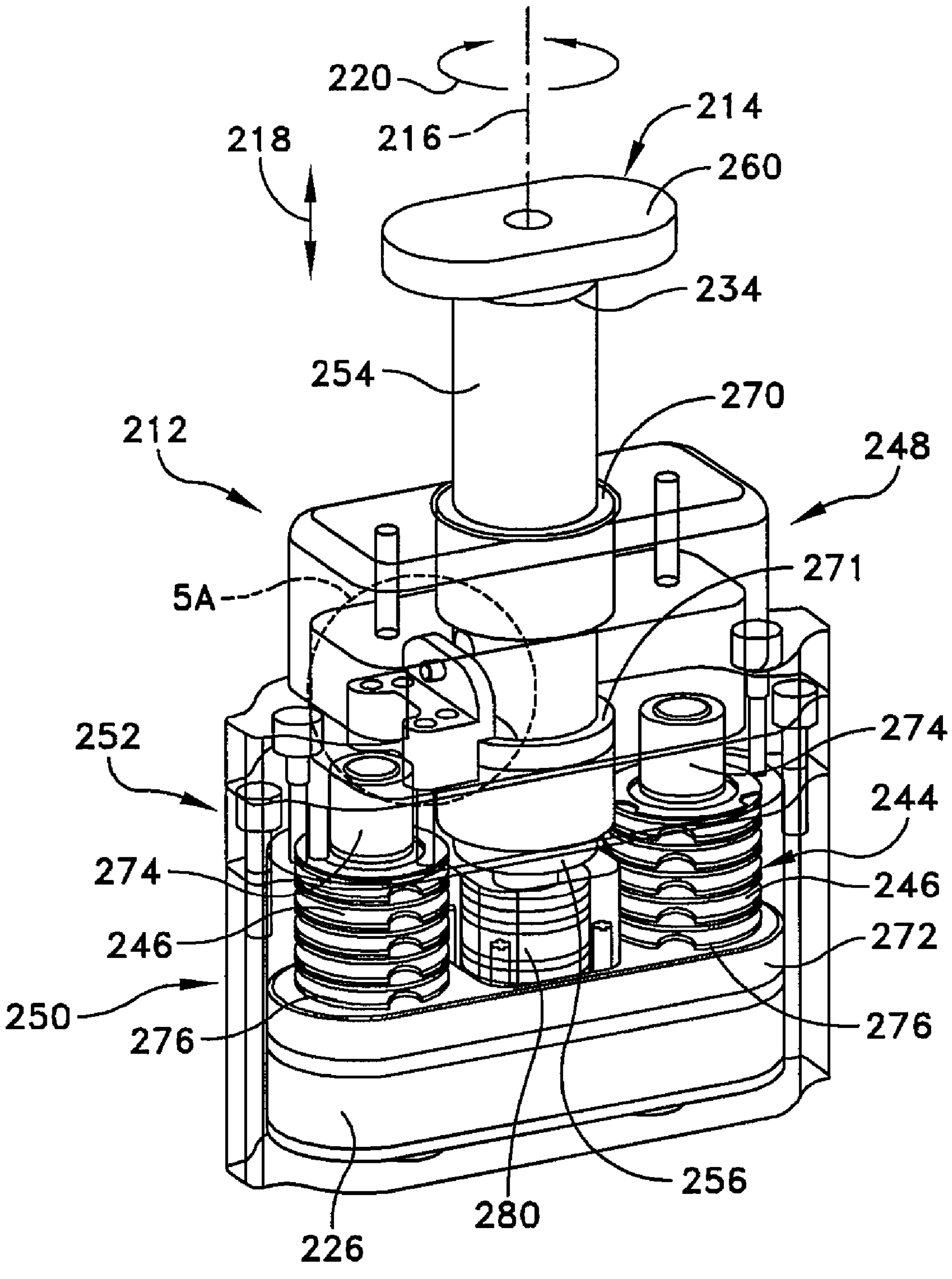
FIG. 5 is a schematic illustration of an embodiment of a clamp.
Figure 5A:
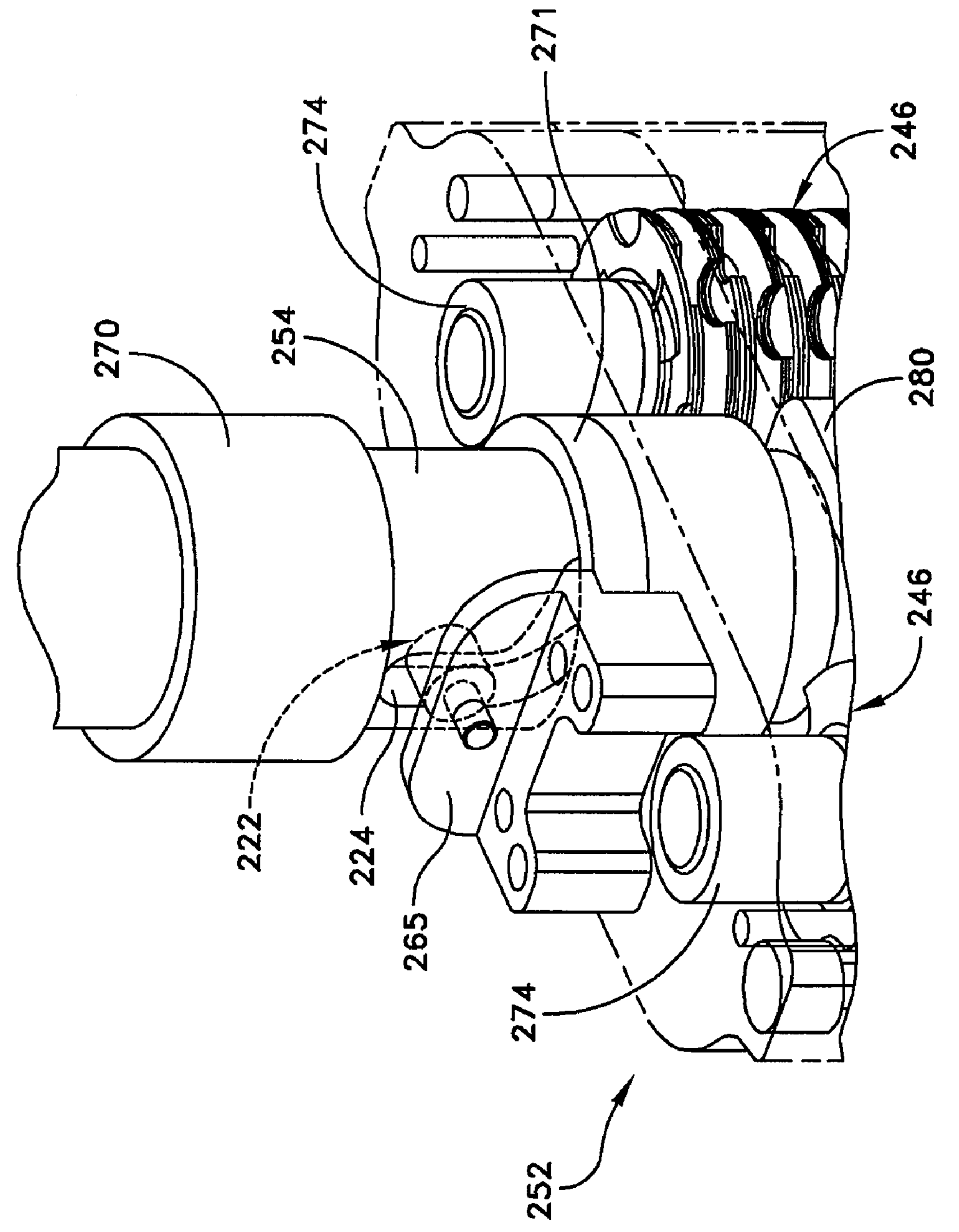
FIG. 5A is an enlarged view of a portion of the clamp of FIG. 5.
Figure 5B:
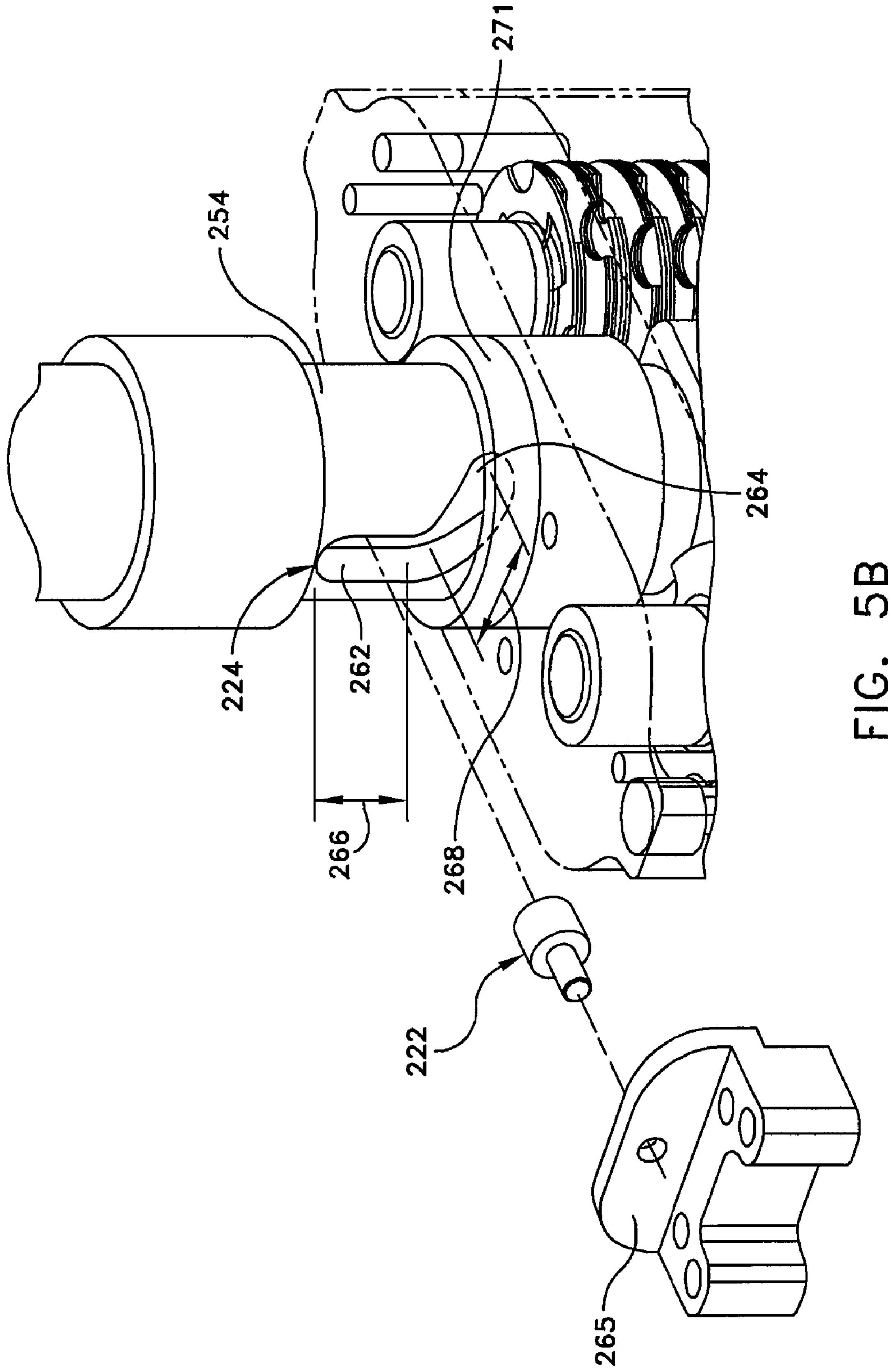
FIG. 5B is an enlarged view of a portion of the claim of FIG. 5.
Figure 6B:
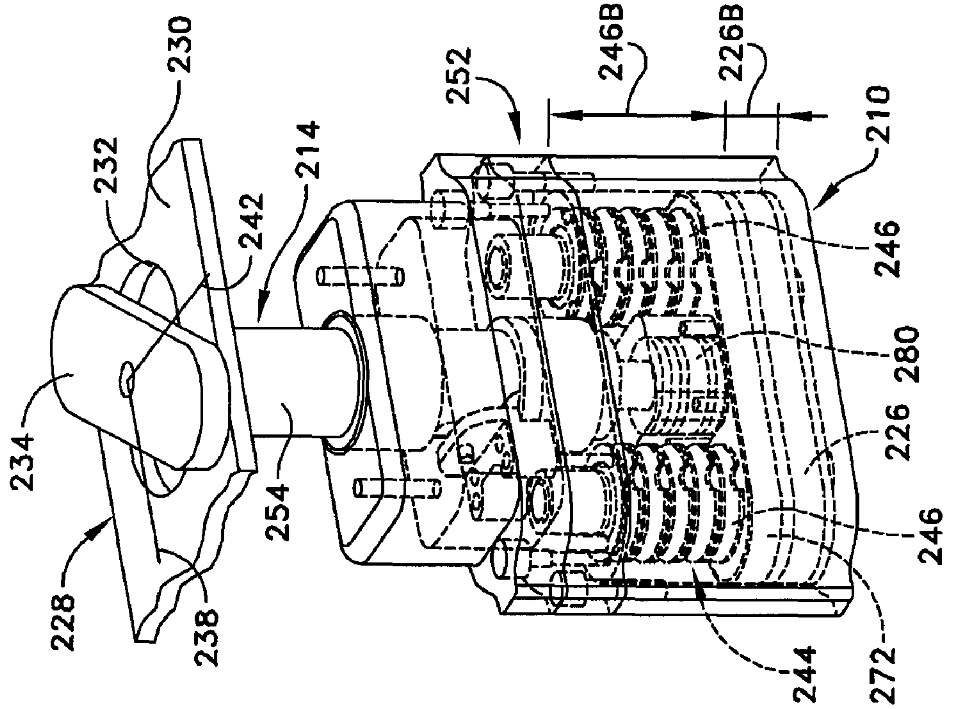
FIGS. 6A, 6B and 6C are perspective sequential views of one operational mode of the clamp.
Figure 6A:
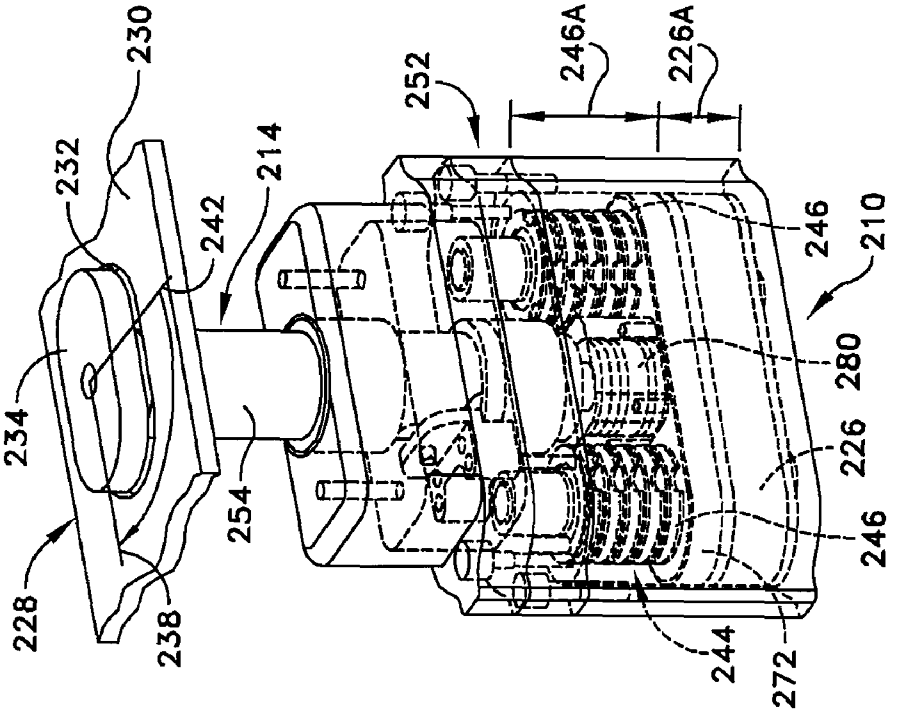
Figure 6C:
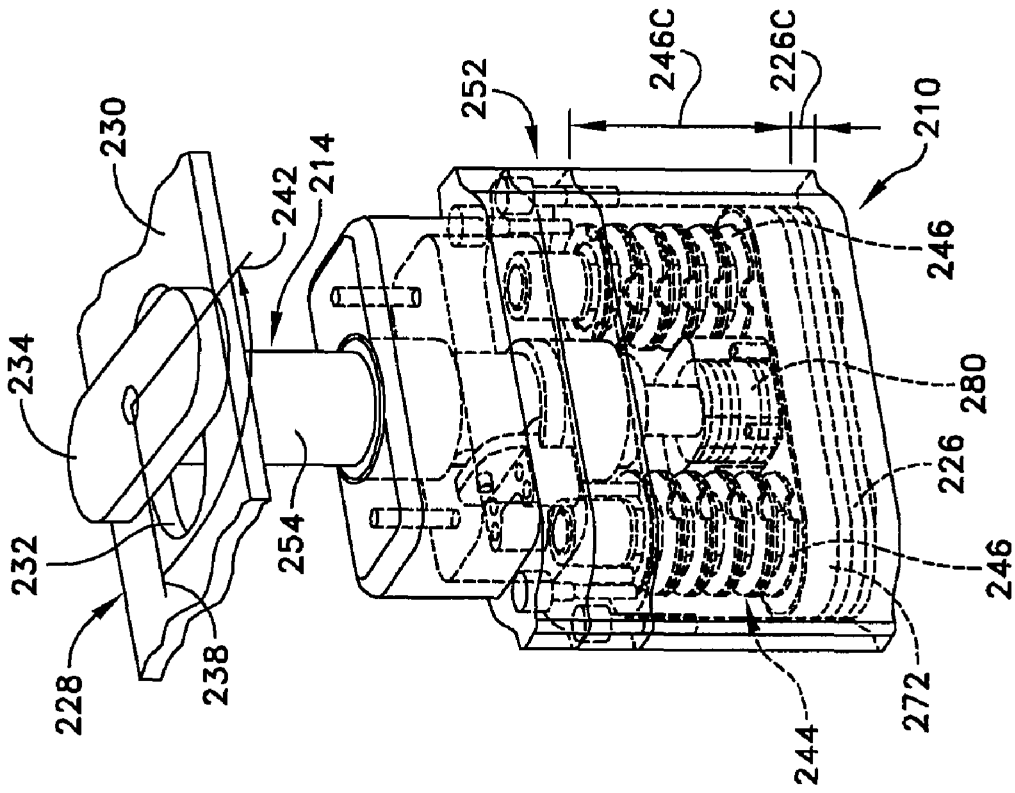

One embodiment of a clamp 210 is illustrated in FIGS. 5 and 5A and comprises a housing 212, and a latch member 214 mounted within housing 212. The mounting arrangement of the latch member 214 within housing 212 allows the latch member 214 to be translated along a displacement axis 216, i.e., generally in the directions indicated by arrows 218. The mounting arrangement also allows the latch member 214 to be rotated about the displacement axis 216, i.e., generally in the directions indicated by arrows 220. A cam follower 222 mounted to housing 212 engages a corresponding channel 224 associated with the latch member 214. An actuator 226 is mounted to housing 212 and is operatively associated with the latch member 214. Actuator 226 moves or translates latch member 214 along the displacement axis 216. As the latch member 214 is translated along displacement axis 216, i.e., in the directions indicated by arrows 218, the engagement of cam follower 222 and channel 224 causes latch member 214 to be rotated about the displacement axis 216, i.e., in the directions indicated by arrows 220. In one embodiment, clamp 210 is provided with a pair of biasing members 244, such as a pair of springs 246, which bias latch member 214 toward a retracted position 240 (FIG. 6C).

The rotation of latch member 214 about displacement axis 216 as latch member 214 is translated along displacement axis 216 allows clamp 210 to engage and securely hold a component 228 to be clamped. With reference now to FIGS. 6A-C, in one exemplary application, component 228 to be clamped may comprise a portion 230 having an aperture or hole 232 formed therein. Aperture 232 is sized to slidably receive a clamp end 234 of the latch member 214 when latch member 214 is in an extended position 236. See FIG. 6A. When latch member 214 is in extended position 236, clamp end 234 of latch member 214 will be located at a displaced rotational position 238. Component 228 to be clamped and clamp 210 may then be brought together in the manner illustrated in FIG. 6B, e.g., so that clamp end 234 of latch member 214 is engaged with and extends through aperture 232 in component. 228 to be clamped.

Actuator 226 may then be operated to cause latch member 214 to be translated along displacement axis 216, e.g., from extended position 236 to retracted position 240. In the embodiment shown and described herein, wherein clamp 210 is provided with a pair of biasing members 244, the latch member 214 may be moved from extended position 236 to retracted position 240 by simply de-energizing actuator 226 and allowing the pair of biasing members 244 to return the latch member 214 to retracted position 240. As latch member 214 returns to the retracted position 240, the engagement of cam follower 222 with channel 224 causes latch member 214 to rotate about displacement axis 216, e.g., from displaced rotational position 238 to an initial rotational position 242. The translation and rotation of latch member 214 causes the clamp end 234 of latch member 214 to clamp component 228 and draw component 228 toward retracted position 240, as best seen in FIG. 6C. In the embodiment shown and described herein, the pair of biasing member 244 (e.g., Belleville springs 246) securely holds component 228 in engagement with clamp 210 without the need to further operate actuator 226.

In an embodiment, clamping is achieved using only a single actuator 226 to produce two desired movements of latch member 214 (i.e., translation along and rotation about the displacement axis 216). The use of a single actuator 226 to produce the two desired movements of the latch member 214 also eliminates the need for a timing sequence to coordinate the two desired movements which would be required if separate actuators were used to produce the two desired movements. In addition, the modular design of clamp 210 allows clamp 210 to be conveniently mounted almost anywhere. The modular design also allows any desired number of clamps to be readily used in a desired application. In embodiments wherein clamp 210 is provided with a pair of biasing members 244 (e.g., Belleville springs 246), the pair of biasing members 244 may be configured to bias the clamp in the retracted position 240 (FIG. 4C). Accordingly, clamp 210 will continue to provide the clamping function without the need to continuously operate or energize the actuator.

Having briefly described one embodiment of a clamp, various exemplary embodiments of the clamp will now be described in greater detail. However, before proceeding with the description it should be noted that the various embodiments of clamp 210 are shown and described herein as they may be used to provide a clamping function in a circuit testing application. In this exemplary application, clamp 210 is mounted to a circuit test head and component 228 to be clamped comprises an electronic device to be tested. Clamp 210 is used to clamp the electronic device to the circuit test head, allowing the test head to test the electronic device. Accordingly, the particular sizes and configurations of the various components of clamp 210, as well as the materials that may be used to fabricate the various components are consistent with this particular application. However, persons having ordinary skill in the art, after having become familiar with the teachings provided herein, will recognize that various modifications may be made to the clamp depending on the particular application.

Referring back now primarily now to FIGS. 5 and 5A, one embodiment of a clamp 210 may comprise a housing 212 configured to receive a latch member 214. Housing 212 and latch member 214 are configured so that latch member 214 is translatable and rotatable about a displacement axis 216, as indicated by arrows 218 and 220, respectively. Accordingly, housing 212 may comprise any of a wide variety of structures and configurations suitable for this purpose. However, by way of example, in the embodiment shown and described herein, housing 212 may comprise an upper housing 248 and a lower housing 250 that are positioned in relation to one another by a support 252, as best seen in FIG. 5.

The various components, such as upper housing 248, lower housing 250, and support 252, comprising housing 212 may be fabricated from any of a wide variety of materials, such as metals, plastics, or combinations thereof, suitable for the intended application. However, by way of example, in one embodiment, the upper and lower housing 248 and 250, as well as the elongate rods 152, are fabricated from aluminum.

In one embodiment, upper housing 248 is provided with a bearing member 270 (FIG. 5) suitable for allowing both axial and radial (i.e., rotational) movement of the latch member 214 with respect to the upper housing 248. Alternatively, a separate bearing member 270 may not be required, depending on the particular application. For example, the particular materials used for the latch member 214 and upper plate 248 may or may not indicate the need for a separate bearing member 270. Similarly, a separate bearing member 270 may not be required if the expected loads are small or if the expected number of cycles during the life of the clamp is low. If a separate bearing member 270 is used, bearing member 270 may comprise any of a wide range of bearing types suitable for the intended application. By way of example, in the embodiment shown and described herein, bearing member 270 comprises a bronze bushing sized to slidably and rotatably receive latch member 214 in the manner described herein.

Latch member 214 is best seen in FIG. 5A and may comprise an elongate shaft 254 having a flange end 256 and a clamp end 234. The clamp end 234 may be provided with a boss or clamp member 260 suitable for engaging the aperture 232 provided in the component 228 to be clamped. See FIGS. 6A-C. Accordingly, the clamp member 260 may comprise any of a wide variety or shapes or configurations and should not be regarded as limited to the particular shape shown and described herein. The clamp member 260 may comprise a separate component that is attached to the elongate shaft 254, as best seen in FIG. 5A. Alternatively, the clamp member 260 could be formed as a single piece (i.e., integral) with elongate shaft 254.

Referring still to FIG. 5A, elongate shaft 254 may also be provided with a channel or groove 224 therein sized to engage cam follower 222. The channel or groove 224 may be provided with a first section 262 that is substantially axially oriented along the length of elongate shaft 254. The channel or groove 224 may also be provided with a second section 264 that includes a transverse component (i.e., a component that is not substantially axially oriented). Length 266 of first section 262 dictates the length or distance by which latch member 214 moves along displacement axis 216 before latch member 214 begins to rotate. Thus, length 266 of first section 262 of channel 224 may be selected to be any convenient length suitable for the intended application.

Length 268 of second section 264 dictates the length or distance by which latch member 214 moves along displacement axis 216, as well as the degree of rotation about displacement axis 216. Thus, the motion "schedule" (i.e., the length by which the latch member moves along displacement axis 216, the degree of rotation about displacement axis 216, as well as the point at which rotation begins) can be selected as desired by simply providing the channel 224 with first and second sections 262 and 264 having the appropriate lengths and transverse components. Consequently, latch member 214 should not be regarded as limited to having a groove or channel 224 having first and second sections 262 and 264 that provide the particular motion schedule shown and described herein. However, by way of example, in one embodiment, groove or channel 224 is configured to provide a total axial (i.e., translational) movement along the displacement axis 216 of about 5.0 millimeters. Groove or channel 224 is configured to provide total rotational movement about displacement axis 216 (i.e., the angular difference between displaced rotational position 238 and initial rotational position 242) of about 90°. In an alternative embodiment, the channel 224 is configured to provide a total rotational movement of about 45°.

The various components comprising latch member 214 may be fabricated from any of a wide variety of materials, such as metals, plastics, or combinations thereof, suitable for the intended application. However, by way of example, in one embodiment, elongate shaft 254 as well as the clamp member 260 are fabricated from a steel.

Cam follower 222 may be mounted to housing 212 at any convenient position that will allow cam follower 222 to engage channel 224 associated with the latch member 114. However, by way of example, in one embodiment, cam follower 222 is mounted within upper housing 248 to support 252 with a cam follower mount 265 in the manner best seen in FIG. 5A.

Cam follower 222 may be fabricated from any of a wide range of materials, such as metals or plastics, suitable for the intended application. However, it is generally preferred that the material used to fabricate cam follower 222 provide a low-friction engagement with elongate shaft 254 in which channel 224 is formed. Cam follower 222 generally provides an engagement with channel 224 with less friction than that of a fixed-position guide pin. As such, and due to rotation of cam follower 222, an interface between of channel 224 and cam follower 222 map be provided with better workmanship and reliability than an interface between a channel and a non-rotating guide pin. In an embodiment, elongate shaft 254 may include steel and cam follower 222 may include an outer bearing surface fabricated from bronze.

Before proceeding it should be noted that the positions of cam follower 222 and channel 224 could be interchanged. (See, for example, FIGS. 7 and 7A.) That is, cam follower 222 could be mounted to latch member 214 and channel 224 provided on housing 212. Still other arrangements are possible, as would become apparent to persons having ordinary skill in the art after having become familiar with the teachings provided herein.

Referring back now to FIGS. 5 and 5A, clamp 210 may also be provided with an actuator 226 suitable for moving the latch member 214 along the displacement axis 216 in the manner described herein. Actuator 226 may comprise any of a wide range of actuators (e.g., pneumatic, hydraulic, or electric) suitable for providing the desired magnitude (i.e., length) of motion of latch member 214 along displacement axis 216. However, by way of example, in one embodiment, the actuator 226 comprises a pneumatic actuator.

In the embodiment shown and described herein, a push plate 272 is positioned between actuator 226 and latch member 214. Push plate 272 is slidably mounted to housing 212 and serves to support flange end 256 of latch member 214 as well as to distribute the force applied by actuator 226. Consequently, push plate 272 helps to prevent binding of the latch member 214 as the same is moved between the retracted position 240 and extended position 236 (See FIGS. 6A-C). Push plate 272 may be fabricated from any of a wide variety of materials (e.g., metals or plastics) suitable for the intended application. By way of example, in one embodiment the push pate 272 is fabricated from steel.

In the embodiment shown and described herein, the clamp 210 is also provided with biasing members 244 which biases latch member 214 in the retracted position 240. The use of the pair of biasing members 244 thereby allows clamp 210 to exert a clamping force on the component 228 (FIGS. 6A-C) being clamped without the need to operate (e.g., continuously energize) actuator 226. Biasing members 244 may comprise Belleville springs 246, which are also known as cupped spring washers, having a first end 274 positioned in contact with support 248. A second end 276 of springs 246 may be received by the push plate 272 in the manner best seen in FIG. 5. In an embodiment, the pair of non-linear Belleville washer-style springs 246 may be configured to provide clamp 210 with a larger clamping force than a set of similarly sized coil springs within a similarly sized housing. Belleville springs are generally a disc-shaped washer with high tensile strength. Belleville springs may be configured to hold substantial load compared to other types of springs.

Springs 246 may be fabricated from any of a wide variety of materials, such as metals or plastics, suitable for the particular application. By way of example, in one embodiment, springs 246 may comprise steel.

It should be noted that if a pair of biasing members 244 are provided, each may be configured or arranged to bias latch member 214 in either retracted position 240 or the extended position 236. If the biasing member 244 is configured to bias latch member 214 in the extended position 236, then continuous operation of actuator 226 will be required to maintain clamping of the component 228 to be clamped, which may be required or desired depending on the particular application.

Referring now primarily to FIG. 5, clamp 210 may be provided with a pair or bearings 280 suitable for receiving the flange end 256 of elongate shaft 254. Bearings 280 supports flange end 256 of elongate shaft 254 and allow elongate shaft 254 to be rotated with respect to push plate 272. In the embodiment shown and described herein, bearings 280 are captured or held between lower support 278 and push plate 272. In this manner, bearings 280 retain flange end 256 of elongate shaft 254 so as to enable a transfer of the clamping force applied by biasing member 244 to both shaft 254 and clamp member 260.

Bearings 280 may comprise any of a wide range of bearing types, depending on the particular application. However, by way of example, in one embodiment, bearings 280 may comprise a pair of thrust bearings.

Clamp 210 may be used in any of a wide variety of applications to clamp or secure a component 228 to be clamped. Consider, for example, the situation illustrated in FIGS. 6A-C wherein component 228 to be clamped comprises a portion 230 having an aperture or hole 232 formed therein. Aperture 232 is sized to slidably receive clamp end 234 provided on latch member 214 when clamp end 234 is in displaced rotational position 238. As mentioned, clamp end 234 of latch member 214 is in displaced rotational position 238 when latch member 214 is in extended position 236. See FIG. 6A. Accordingly, a first step in the clamping process involves operating actuator 226 to move latch member 214 to the extended position 236. Component 228 to be clamped and clamp 210 may then be brought together in the manner shown in FIG. 6B, i.e., so that clamp end 234 of latch member 214 is engaged with and extends through aperture 232 in component 228 to be clamped.

Actuator 226 may then operated to cause latch member 214 to be translated along displacement axis 216, e.g., from extended position 236 to retracted position 240 illustrated in FIG. 6C. Latch member 214 may be moved from the extended position 236 to retracted position 240 by operating actuator 226 to return latch member 214 to retracted position 240. In the embodiment shown and described herein, wherein clamp 210 includes a biasing member 244 for biasing latch member 214 toward retracted position 240, latch member 214 may be returned to retracted position 240 by simply de-energizing actuator 226. In the case where actuator 226 comprises a pneumatic actuator, this can be accomplished by simply releasing the air pressure supplied to actuator 226. As latch member 214 moves to retracted position 240, engagement of guide pin 222 with channel 224 causes latch member 214 to rotate about displacement axis 216, e.g., from displaced rotational position 238 to initial rotational position 242. The translation and rotation of latch member 214 causes clamp end 234 of latch member 214 to clamp component 228 and draw component 228 toward retracted position 240, as best seen in FIG. 6C). Biasing members 244 (e.g., springs 246) securely hold component 228 in engagement with clamp 210 without the need to further operate the actuator 226.

Component 228 to be clamped may be released by operating actuator 226 to move latch member 214 to extended position 236. As latch member 214 moves to the extended position, the engagement of guide pin 222 and channel 224 causes latch member 214 to be rotated from initial rotational position 242 (FIG. 6C) to displaced rotational position 238 (FIG. 6A), thereby allowing component 228 to be disengaged from clamp 210.

Figure 7:
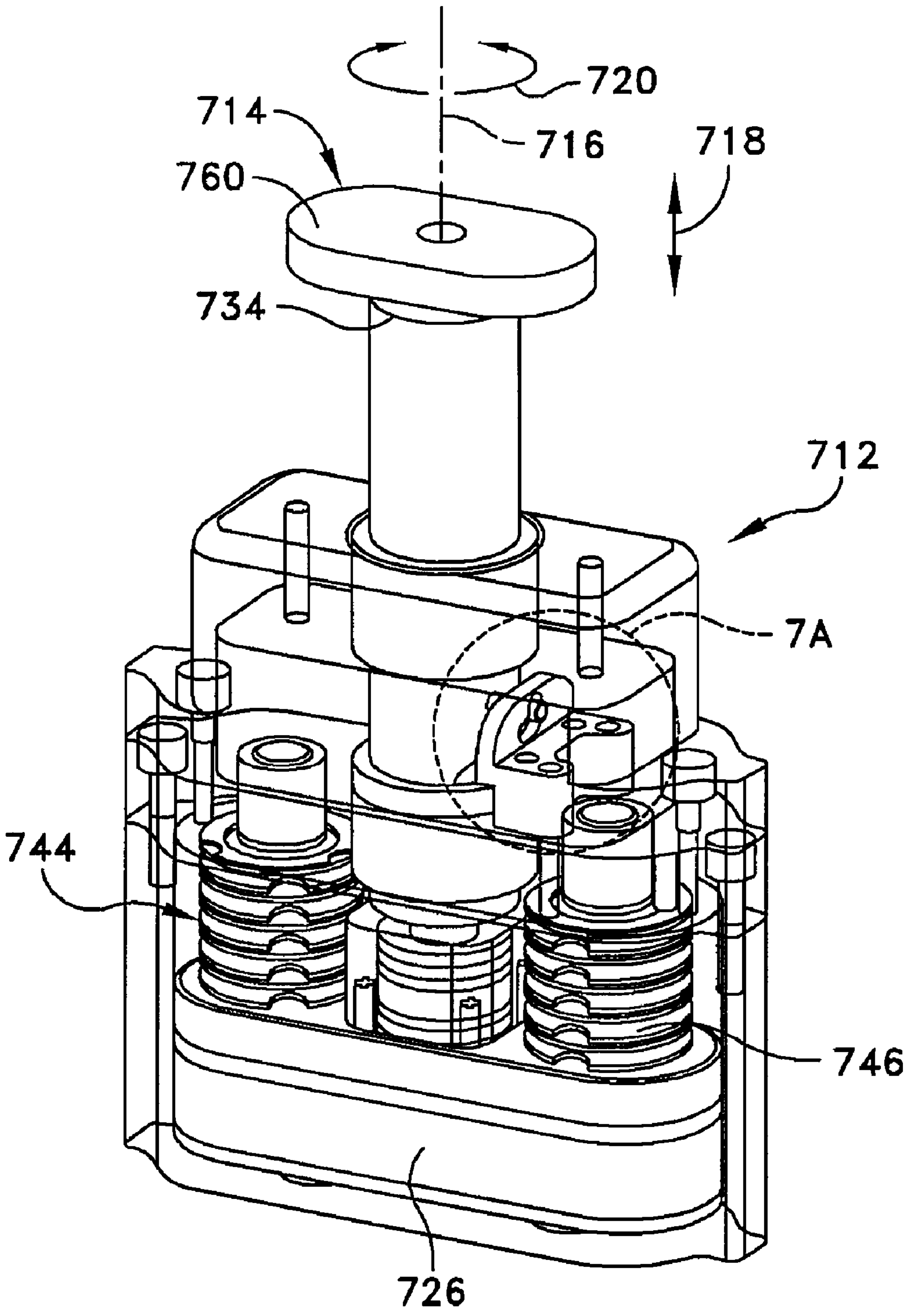
FIG. 7 illustrates another embodiment of a clamp.
Figure 7A:
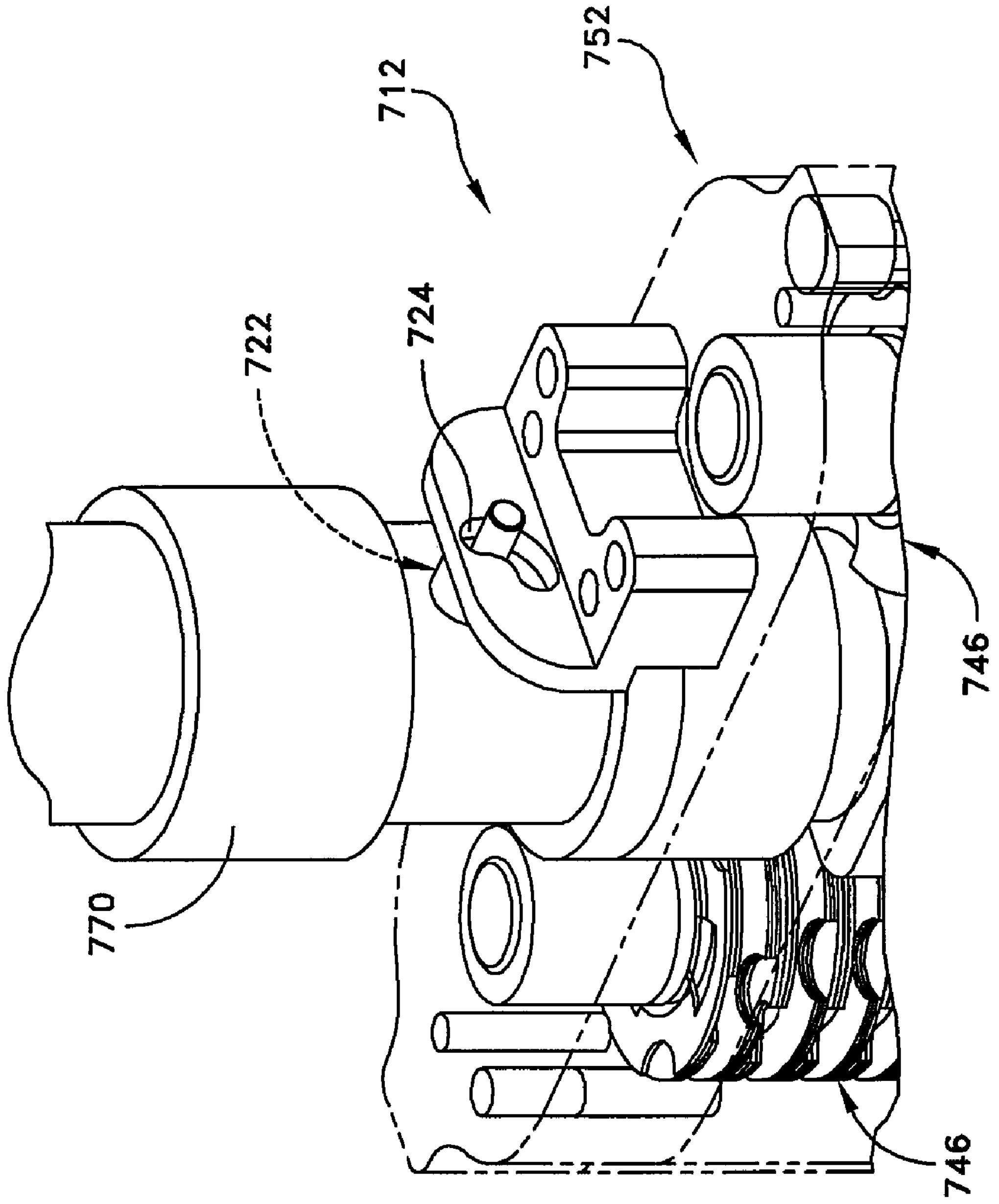
Figure 7B:
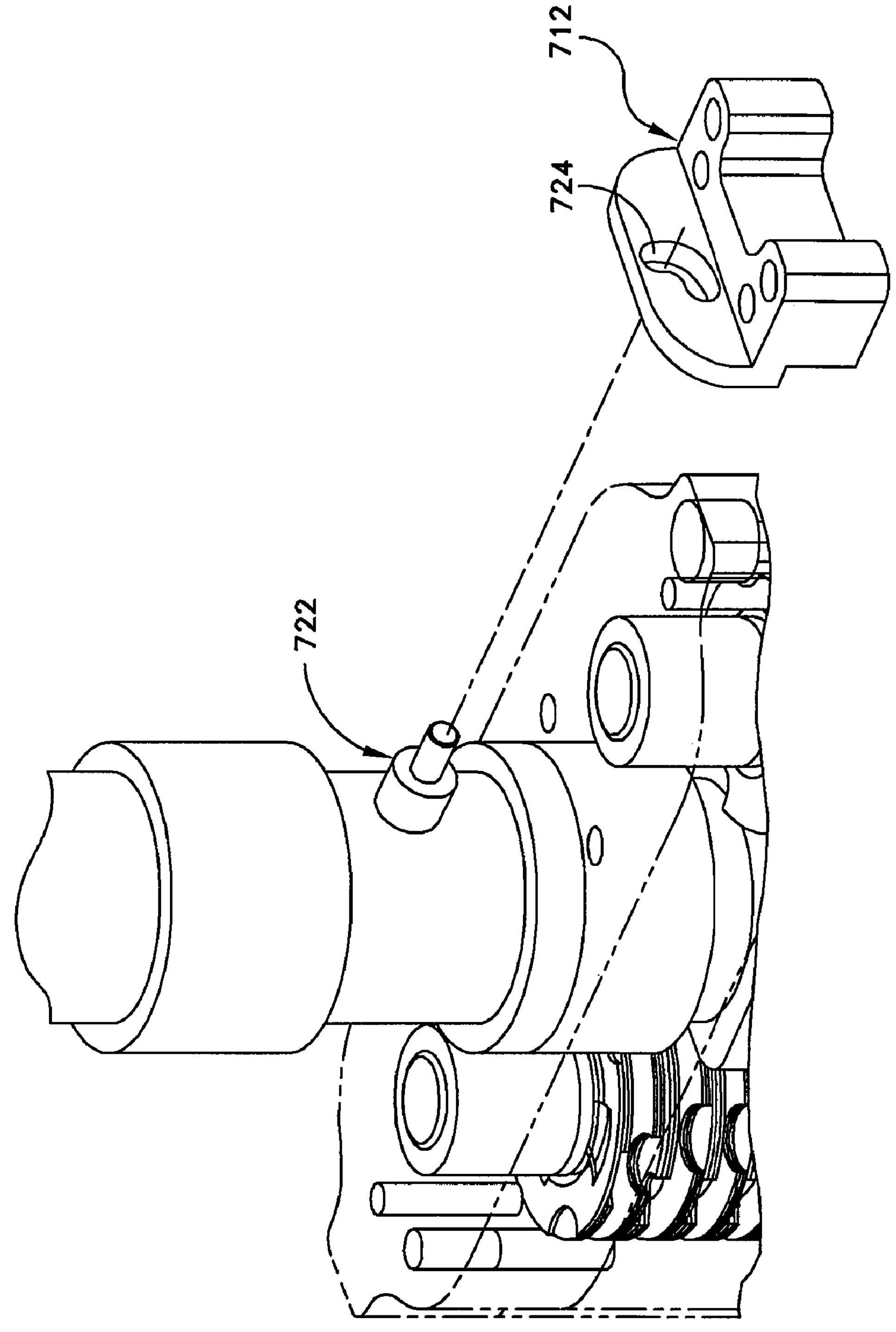

Another exemplary embodiment of a clamp 710 is illustrated in FIGS. 7 and 7A and comprises a housing 712, and a latch member 714 mounted within housing 712. The mounting arrangement of the latch member 714 within housing 712 allows the latch member 714 to be translated along a displacement axis 716, i.e., generally in the directions indicated by arrows 718. The mounting arrangement also allows the latch member 714 to be rotated about the displacement axis 716, i.e., generally in the directions indicated by arrows 720. A cam follower 722 mounted to latch member 714 engages a corresponding channel 724 defined by housing 712. An actuator 726 is mounted to housing 712 and is operatively associated with the latch member 714. Actuator 726 moves or translates latch member 714 along the displacement axis 716. As the latch member 714 is translated along displacement axis 716, i.e., in the directions indicated by arrows 718, the engagement of cam follower 722 and channel 724 causes latch member 714 to be rotated about the displacement axis 716, i.e., in the directions indicated by arrows 720. In one embodiment, clamp 710 is provided with a pair of biasing members 744, such as a pair of springs 746, which bias latch member 714 toward a retracted position.

The rotation of latch member 714 about displacement axis 716 as latch member 714 is translated along displacement axis 716 allows clamp 710 to engage and securely hold a component 728 to be clamped. For example, clamp 710 may be utilized in a manner similar to the exemplary application shown in FIGS. 6A-C.

The invention claimed is:

1. A clamp, comprising:

a housing;

at least one bearing member in the housing;

a latch member, slidably and rotatably mounted within said at least one bearing member of said housing so that said latch member is translatable along a displacement axis and rotatable about the displacement axis, said latch member defining a channel therein;

a cam follower mounted to said housing, said cam follower engaging the channel in said latch member external to each of said at least one bearing member; and an actuator mounted to said housing and operatively associated with said latch member, said actuator translating said latch member along the displacement axis, the engagement of said cam follower in the channel causing said latch member to be rotated about the displacement axis as said latch member is translated along the displacement axis.

2. The clamp of claim 1, further comprising a biasing member operatively associated with said latch member and said housing, said biasing member biasing said latch member toward a retracted position.

3. The clamp of claim 2, wherein said biasing member comprises a pair of Belleville springs.

4. The clamp of claim 1, wherein said actuator comprises a pneumatic actuator.

5. The clamp of claim 1, wherein said channel is curved so that said guide pin causes said latch member to rotate about the displacement axis by an angle of about 45° as said latch member is translated along the displacement axis from a retracted position to an extended position.

6. The clamp of claim 1, wherein said latch member comprises an elongate shaft having a clamp end and a flange end.

7. The clamp of claim 6, further comprising a bearing, said bearing being received by said housing, said bearing being sized to receive the flange end of said latch member.

8. The clamp of claim 7, wherein said bearing comprises a thrust bearing.

9. The clamp of claim 1, wherein said housing comprises a lower housing, an upper housing, and a support, said support positioning said upper housing and said lower housing in relation to one another.

10. The clamp of claim 9, wherein said upper housing defines an aperture therein for slidably and rotatably receiving said latch member.

11. The clamp of claim 10, wherein said cam follower is mounted in connection to said support.

12. The clamp of claim 11, further comprising a push plate slidably mounted within said lower housing so that said push plate is moveable along the displacement axis with respect to said actuator, said push plate operatively associated with said latch member so that said latch member moves along the displacement axis with said push plate.

13. The clamp of claim 12, further comprising an actuator positioned between said lower housing and said push plate, said actuator moving said push plate along the displacement axis.

14. The clamp of claim 13, wherein said actuator comprises a pneumatic actuator.

15. The clamp of claim 14, further comprising a pair of springs positioned between said support and said push plate, said pair of springs biasing said push plate toward a retracted position.

16. The clamp of claim 15, further comprising a pair of bearings mounted to said push plate, the pair of bearings positioned to receive said latch member, said pair of bearings allowing said latch member to rotate with respect to said push plate, and said bearing retaining the latch member to transfer a force of said spring to said latch member.

17. A method for operating a clamp, comprising:

operating an actuator to cause a latch member to translate along a displacement axis toward an extended position relative to a housing of the clamp, the latch member cooperating with a cam follower mounted to the housing so that the latch member rotates about the displacement axis as the latch member is translated along the displacement axis, the latch member translating and rotating in at least one bearing member in the housing, and the latch member cooperating with the cam follower external to each of said at least one bearing member;

engaging a clamp end of the latch member with a component to be clamped; and operating the actuator to cause the latch member to translate along the displacement path toward a retracted position, the cam follower causing the latch member to rotate about the displacement axis as the latch member is translated along the displacement axis to the retracted position, the rotation and translation of the latch member causing the clamp end of the latch member to clamp the component and draw the component toward the retracted position.

18. The method of claim 17, wherein operating the actuator to cause the latch member to translate along the displacement axis toward the extended position comprises activating the actuator to translate the latch member to the extended position against a biasing force imposed by a pair of biasing members.

19. The method of claim 17 wherein operating the actuator to cause the latch member to translate along the displacement axis toward the retracted position comprises deactivating the actuator to allow the pair of biasing members to translate the latch member to the retracted position.

20. A clamp, comprising:

a latch member;

a housing, said housing having at least one bearing member in which said latch member is received so that said latch member is translatable along a displacement axis and rotatable about the displacement axis, said housing defining a channel therein, said channel being external to each of said at least one bearing member;

a cam follower mounted to said latch member, said cam follower engaging the channel in said housing; and an actuator mounted to said housing and operatively associated with said latch member, said actuator translating said latch member along the displacement axis, the engagement of said cam follower in the channel causing said latch member to be rotated about the displacement axis as said latch member is translated along the displacement axis.

21. A clamp, comprising:

a housing;

a latch member mounted within said housing so that said latch member is translatable along a displacement axis and rotatable about the displacement axis, said latch member defining a channel therein, wherein said latch member comprises an elongate shaft having a clamp end and a flange end;

a cam follower mounted to said housing, said cam follower engaging the channel in said latch member;

an actuator mounted to said housing and operatively associated with said latch member, said actuator translating said latch member along the displacement axis, the engagement of said cam follower in the channel causing said latch member to be rotated about the displacement axis as said latch member is translated along the displacement axis; and a bearing, said bearing being received by said housing, said bearing being sized to receive the flange end of said latch member, wherein said bearing comprises a thrust bearing.

22. A clamp, comprising:

a housing, said housing including a lower housing, an upper housing, and a support, said support positioning said upper housing and said lower housing in relation to one another, said upper housing defining an aperture therein for slidably and rotatably receiving said latch member;

a latch member mounted within said housing so that said latch member is translatable along a displacement axis and rotatable about the displacement axis, said latch member defining a channel therein;

a cam follower mounted to said housing, said cam follower engaging the channel in said latch member, said cam follower mounted in connection to said support;

an actuator mounted to said housing and operatively associated with said latch member, said actuator translating said latch member along the displacement axis, the engagement of said cam follower in the channel causing said latch member to be rotated about the displacement axis as said latch member is translated along the displacement axis;

a push plate slidably mounted within said lower housing so that said push plate is moveable along the displacement axis with respect to said actuator, said push plate operatively associated with said latch member so that said latch member moves along the displacement axis with said push plate;

an actuator positioned between said lower housing and said push plate, said actuator moving said push plate along the displacement axis, said actuator including a pneumatic actuator; and a pair of springs positioned between said support and said push plate, said pair of springs biasing said push plate toward a retracted position;

a pair of bearings mounted to said push plate, the pair of bearings positioned to receive said latch member, said pair of bearings allowing said latch member to rotate with respect to said push plate, and said bearing retaining the latch member to transfer a force of said spring to said latch member.

* * * * *

UNITED STATES PATENT AND TRADEMARK OFFICE

CERTIFICATE OF CORRECTION

PATENT NO. : 7,934,710 B2
APPLICATION NO. : 11/734187
DATED : May 3, 2011
INVENTOR(S) : Donald Wai-Chung Chiu It is certified that error appears in the above-identified patent and that said Letters Patent is hereby corrected as shown below:

Column 2, line 25, "portion of the claim" should read --portion of the clamp--.

Column 10, line 34, "follower 222 map" should read --follower 222 may--.

Signed and Sealed this
Twelfth Day of July, 2011

David J. Kappos
*Director of the United States Patent and Trademark Office*